United States Patent [19]

Spease

[11] 4,333,361
[45] Jun. 8, 1982

[54] REMOTE CONTROL (SWIVEL JOINT)

[75] Inventor: Arthur L. Spease, Livonia, Mich.

[73] Assignee: Teleflex Incorporated, Limerick, Pa.

[21] Appl. No.: 143,902

[22] Filed: Apr. 25, 1980

[51] Int. Cl.³ .............................................. F16C 1/10
[52] U.S. Cl. ................. 74/501 P; 74/501 R; 403/197
[58] Field of Search ............... 74/501 R, 501 P, 502; 403/197, 195, 238; 285/162

[56] References Cited

U.S. PATENT DOCUMENTS

| 3,013,443 | 12/1961 | Morse ................................ 74/501 P |
| 3,427,894 | 2/1969 | Tschanz . |
| 3,438,280 | 4/1969 | McCabe . |
| 3,542,980 | 11/1970 | Hamilton ............................ 403/197 |
| 4,238,974 | 12/1980 | Fawcett ............................ 74/501 R |

FOREIGN PATENT DOCUMENTS 1022850 1/1958 Fed. Rep. of Germany ........ 74/502

362067 8/1938 Italy ...................... 74/501

*Primary Examiner*—Kenneth Dorner
*Attorney, Agent, or Firm*—McGlynn and Milton

[57] ABSTRACT

A motion transmitting remote control assembly of the type for transmitting motion in a curved path by a flexible motion transmitting core element including a motion transmitting core element and a guide assembly for movably supporting the core element. The guide assembly includes a rigid end fitting having a bore therethrough. The core element includes a rigid bar extending therefrom and supported for reciprocating movement in the bore of the end fitting. The assembly includes a support fitting for supporting the end fitting on a support structure. The assembly is characterized by a swivel joint interconnecting the support fitting and the end fitting at an intermediate position spaced from the ends of the end fitting for allowing pivotal movement of the end fitting about the swivel joint and movement of the bar into the end fitting and through the swivel joint.

10 Claims, 3 Drawing Figures

REMOTE CONTROL (SWIVEL JOINT)

BACKGROUND OF THE INVENTION

1. Field of the Invention

The instant invention relates to a motion transmitting remote control assembly of the type for transmitting motion in a curved path by a flexible motion transmitting core element which passes through a support structure.

2. Description of the Prior Art

Swivel joints are well known in the art of remote control assemblies for providing a swivel movement to a remote control cable. Often cables are actuated by means such as levers which travel in an arcuate path. The levers are generally connected to the cable via a rigid, terminal member. The cable generally extends from an end fitting. Also, it is a common necessity for cables to pass through walls such as bulkheads or other support structures which support the end fitting. In many automotive assemblies, as well as other vehicles, it is necessary for the lever to actuate the control cable in close proximity to the support structure. Therefore, the movement of the lever is limited by the extent that the rigid terminal can enter the end fitting. Also, the arcuate movement of the lever requires that the end fitting be able to swivel relative to the support structure and the length of the end fitting presents a limitation to the amount of movement of the lever. The resulting problem is that prior art fittings have imposed limitations on the extent of movement that levers can either impart on a control cable or vice versa. Therefore, prior art structures require ample space to allow for the necessary distance between the lever and the support structure so that the lever can impart the necessary amount of movement to the core element or vice versa. The instant invention provides an answer to the problem in that the travel of the terminal member is not limited by the swivel joint.

SUMMARY OF THE INVENTION

The instant invention provides a motion transmitting remote control assembly of the type for transmitting motion in a curved path by a flexible motion transmitting core element. The assembly includes a motion transmitting core element and a guide assembly for movably supporting the core element. The guide assembly includes a rigid end fitting having first and second ends with a bore therethrough and between the ends. The core element includes a rigid bar extending from the first end of the fitting and supported for reciprocating movement in the bore of the end fitting. The assembly also includes a support fitting for supporting the end fitting on a support structure. The assembly is characterized by a swivel joint interconnecting the support fitting and the end fitting at an intermediate position spaced from both of the first and second ends of the end fitting for allowing pivotal movement of the end fitting about the swivel joint and movement of the bar into the end fitting and through the swivel joint.

PRIOR ART STATEMENT

An example of a prior art remote control assembly teaching a fitting secured to a conduit is U.S. Pat. No. 3,438,280 to McCabe, issued Apr. 15, 1969. The patent discloses a fitting including a spheroid portion rotatably engaged within a support structure. However, this assembly is not adapted for receiving a terminal bar member as through the swivel joint.

The general concept of a remote control assembly including a snap-on support fitting is disclosed in the U.S. Pat. No. 3,427,894 to Tschanz, issued Feb. 18, 1969. The patent does not provide a swivel means nor does it teach the novel means for retaining an end fitting within the support fitting, as is provided in the instant invention.

BRIEF DESCRIPTION OF THE DRAWINGS

Other advantages of the present invention will be readily appreciated as the the same becomes better understood by reference to the following detailed description when considered in connection with the accompanying drawings wherein.

DESCRIPTION OF PREFERRED EMBODIMENT

Figure 1:
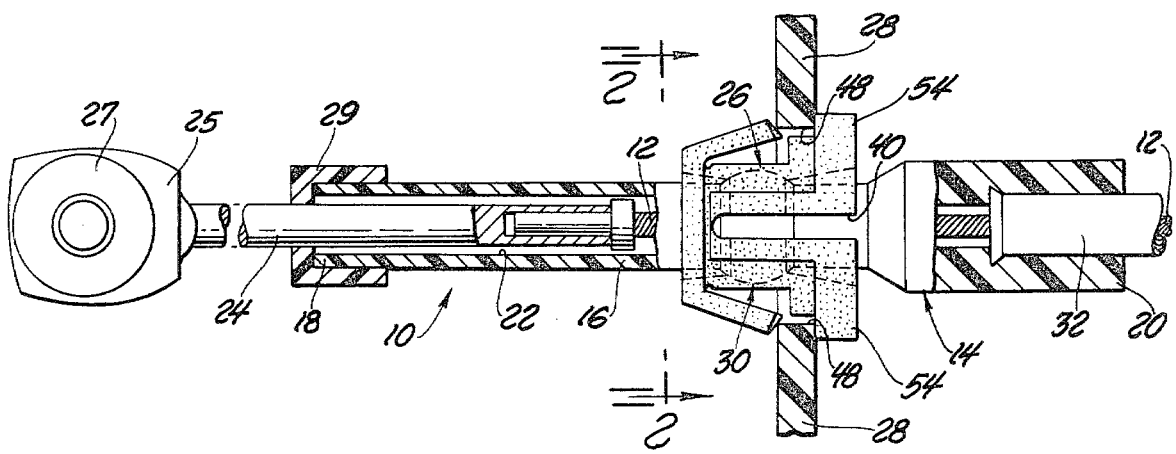
FIG. 1 is a partially broken-away, longitudinal cross-sectional view of the instant invention.

A motion transmitting remote control assembly of the type for transmitting motion in a curved path by a flexible motion transmitting core element constructed in accordance with the instant invention is generally shown at 10 in FIG. 1.

The assembly 10 includes a motion transmitting core element 12 and guide means generally indicated at 14 for movably supporting the core element 12. The guide means 14 includes a rigid end fitting 16 having first 18 and second 20 ends with a bore 22 therethrough and between the ends 18 and 20. In other words, the end fitting 16 is a rigid, hollow tubular member.

The core element 12 includes a rigid bar 24 extending from the first end 18 of the end fitting 16. The rigid bar 24 can be secured to the end of the core element 12 by methods well known in the art such as swaging. The rigid metal bar 24 includes a terminal 25 for receiving connection means for actuating the core element such as a pin extending from a lever. Alternatively, the core element would actuate a member such as a lever. In the preferred embodiment, the terminal member includes a bushing 27 for receiving the connection means.

As shown in FIG. 1, the end fitting 14 includes a wiper member 29 disposed about the first end 18 of the end fitting 14. The wiper 29 extends about the first end 18 of the end fitting 14 for closely surrounding the rigid bar 24, thereby preventing dust and moisture from entering the remote control assembly 10.

The assembly 10 includes support means generally indicated at 26 for supporting the end fitting 16 through support structure 28. The support structure 28 can be a bulkhead or other type of wall separating two compartments such that the remote control assembly passes from one compartment through the support structure 28 and into another compartment.

The assembly 10 is characterized by swivel joint means generally indicated at 30 interconnecting the support means 26 and the end fitting 16 at an intermediate position spaced from both the first 18 and second 20 ends for allowing pivotal movement of the end fitting 16 about the swivel joint means 30 and movement of the bar 24 into the end fitting 16 and through the swivel joint means 30. Specifically, the end fitting 14 provides a rigid structure through which the rigid bar 24 may extend entirely through. Unlike prior art remote control assemblies, the movement of the rigid bar 24 is not limited by the swivel joint means 30. Furthermore, the swivel joint means allows pivotal movement of the end fitting about the support means 26. Therefore, when the terminal 25 is secured to an arcuately moving lever member, the arcuate movement of the lever is not limited by the length of the end fitting from the swivel joint. Thus, the lever can be located in closer proximity to the support structure 28 in comparison to prior art assemblies. In other words, the instant invention provides an end fitting 16 which is rigid so as to receive a rigid bar member and which also pivots in relation to a support structure so as to not limit an arcuately moving actuator such as a lever.

The guide means 14 includes a flexible conduit 32 attached to and extending from the second end 20 of the end fitting 16. In the preferred embodiment of the instant invention the second end 20 of the end fitting 16 is molded about the flexible conduit 32 so as to secure the flexible conduit 32 within the end fitting 14. Other methods well known in the art can be used to secure the conduit 32 to the end fitting 14 and still allow the assembly to function in accordance with the instant invention.

Figure 3:
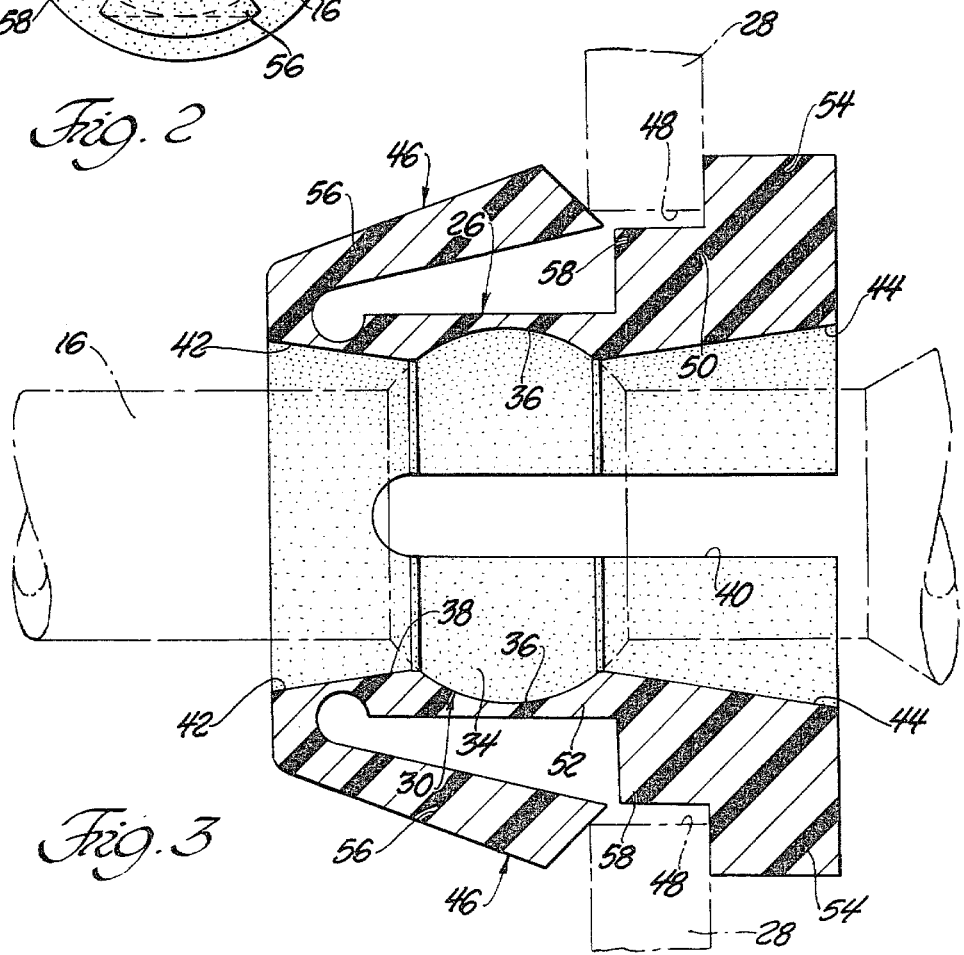
FIG. 3 is an enlarged, longitudinal cross-sectional view of the instant invention.

As shown in FIG. 3, the swivel joint means 30 includes a spherical male portion 34 and a coacting spherical female portion 36. The support means 26 has a passageway 38 therethrough with one of the male 34 and female 36 portions disposed in the passageway. In the preferred embodiment of the subject invention, the male portion 34 is disposed about the end fitting 16 and the female portion 36 is disposed within the passageway 38.

The support means 26 includes at least one slot 40 extending parallel to the passageway 38 through the male 34 and female 36 portions for allowing the support means 26 to open during assembly so as to snap the male 34 and female 36 portions together. In the preferred embodiment shown in FIG. 2, the support means includes two slots 40. In the preferred embodiment shown in FIG. 2, the support means includes two slots 40. In constructing the assembly, when the support means 26 is not within the support structure 28, it unfolds about the slots 40 for receiving the end fitting 26 therein. The support means 26, when inserted into an aperture 48 of a support structure 28, folds about the end fitting 16 thereby retaining the end fitting 16 within the passageway 38.

As shown in FIG. 3, the passageway 38 is flared outward from the swivel joint means 30 in both directions for allowing the end fitting 16 to swivel about the swivel joint means 30.

Figure 2:
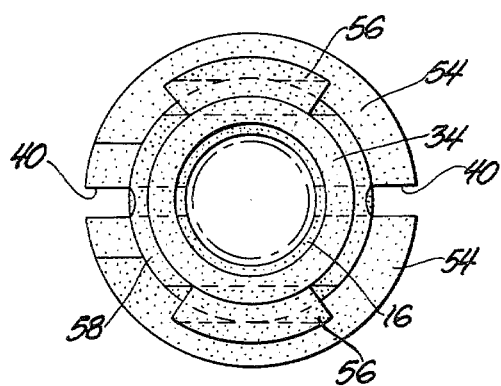
FIG. 2 is a cross-sectional view taken substantially along lines 2—2 in FIG. 1.

The support means 26 includes retaining means generally indicated at 46 for retaining the support means 26 in an aperture 48 in the support structure 28 which surrounds the support means 26 and prevents the support means 26 from opening to disengage the male and female portions 34 and 36. As shown in FIG. 2, the preferred embodiment includes an end fitting 16 which is circular in cross section and the male spherical portion 34 is disposed about the end fitting 16. The female spherical portion 36 is disposed in the passageway of the support means 26.

As shown in FIG. 3, the support means 26 includes a snap-in support fitting 50 having a body portion 52 with the retaining means 46 thereof including a flange 54 for engaging the support structure 28 at one extremity of the aperture 48 therein to prevent the support fitting 50 from moving through the aperture 48. The support fitting 50 also includes a pair of flexible legs 56 extending towards the flange 54 in a cantilevered fashion from the body portion 52 and spaced from the flange 54 for moving through the aperture 48 as the support fitting 50 is inserted therein. The legs 56 also engage the support structure 28 at the other extremity of the aperture 44 for retaining the support fitting 50 therein.

The body portion 52 includes a raised portion 58 in the space between the legs 56 and the flange 54 for being in close position to the support structure within the aperture 44 thereby preventing the body portion 52 from opening so as to maintain the male 34 and female 36 portions in engagement. In other words, the raised portion 58 is closely engaged by the support structure 38 within the aperture 48 so as to maintain the support means 26 about the end fitting 16 thereby securing the end fitting within the support means 26. The end fitting 16 is secured within the support means 26 about the swivel joint means 38, as shown in FIG. 3. The support fitting 50 is folded about the end fitting 16 so that the male portion 34 of the end fitting 16 is engaged by the female portion 36 of the support fitting 50.

In the preferred embodiment shown in FIG. 1 the core element 12 is a flexible wire-like element. The conduit 32 can be constructed so as to include long lay wires disposed therein.

The fittings 16 and 50 are made of organic polymeric material. These fittings can be constructed out of other materials so as to result in a rigid end fitting and function in accordance with the instant invention.

As shown in FIG. 2, the support fitting 50 is circular for insertion into a round aperture. However, alternative embodiments of the instant invention can be constructed wherein the support fitting can be molded so as to assume various shapes so as to be received within similarly shaped apertures.

The instant invention has been described in an illustrative manner and it is to be understood that the terminology which has been used in intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A motion transmitting remote control assembly (10) of the type for transmitting motion in a curved path by a flexible motion transmitting core element (12), said assembly (10) comprising: a motion transmitting core element (12); guide means (14) for movably supporting said core element (12), said guide means (14) including a rigid end fitting (16) having first and second ends (18, 20) with a bore (22) therethrough and between said ends (18, 20), said core element (12) including a rigid bar (24) extending from said first end (18) of said end fitting (16) and supported for reciprocating movement in said bore (22) of said end fitting (16); support means (26) for supporting said end fitting (16) in a support structure (28); and characterized by swivel joint means (30) interconnecting said support means (26) and said end fitting (16) at an intermediate position spaced from both of said first and second ends (18, 20) for allowing pivotal movement of said end fitting (16) and said bar (24) about said swivel joint means (30) while at the same time allowing movement of said bar (24) in said end fitting (16) and through said swivel joint means (30), said guide means (14) including a flexible conduit (32) attached to and extending from said second end (20) of said end fitting (16).

2. An assembly as set forth in claim 1 wherein said swivel joint means (30) includes a spherical male portion (34) and a coacting spherical female portion (36), said support means (26) having a passageway (38) therethrough with one of said male (34) and female (36) portions disposed in said passageway (38), said support means (26) having at least one slot (40) extending parallel to said passageway (38) through said male (34) and female (36) portions for allowing said support means (26) to open during assembly to snap said male (34) and female (36) portions together.

3. An assembly as set forth in claim 2 wherein said passageway (38) is flared outward from said swivel joint means (30) in both directions for allowing said end fitting (16) to swivel about said swivel joint means (30).

4. An assembly as set forth in claim 3 wherein said support means (26) includes retaining means (46) for retaining said support means (26) in an aperture (48) in the support structure (28) which surrounds said support means (26) and prevents said support means (26) from opening to disengage said male and female portions (34, 36).

5. An assembly as set forth in claim 4 wherein said end fitting (16) is circular in cross section and said male spherical portion (34) is disposed about said end fitting (16), said female spherical portion (36) is disposed in said passageway (38) of said support means (26).

6. An assembly as set forth in claim 5 wherein said support means (26) comprises a snap-in support fitting (50) having a body portion (52) with said retaining means (46) thereof including a flange (54) for engaging the support structure (28) at one extremity of the aperture (48) therein to prevent the support fitting (50) from moving through the aperture (48) and a pair of flexible legs (56) extending toward said flange (54) in a cantilevered fashion from said body portion (52) and spaced from said flange (54) for moving through the aperture (48) as said support fitting (50) is inserted therein and for engaging the support structure (28) at the other extremity of the aperture (44) for retaining said support fitting (50) therein.

7. An assembly as set forth in claim 6 wherein said body portion (52) includes a raised portion (58) in the space between said legs (56) and said flange (54) for close positioning to the support structure (28) within the aperture (44) for preventing said body portion (52) from opening to thereby maintain said male and female portions (34, 36) in engagement.

8. An assembly as set forth in claim 7 wherein said core element (13) is a flexible wire-like element.

9. An assembly as set forth in claim 8 wherein said fittings (16, 50) are made of organic polymeric material.

10. An assembly as set forth in claim 9 wherein said support fitting (50) is circular for insertion into a round aperture (48).

* * * * *